United States Patent
Wang

(10) Patent No.: US 6,850,642 B1
(45) Date of Patent: Feb. 1, 2005

(54) DYNAMIC HISTOGRAM EQUALIZATION FOR HIGH DYNAMIC RANGE IMAGES

(75) Inventor: Yibing Michelle Wang, La Jolla, CA (US)

(73) Assignee: Micron Technology, Inc., Boise, ID (US)

( * ) Notice: Subject to any disclaimer, the term of this patent is extended or adjusted under 35 U.S.C. 154(b) by 670 days.

(21) Appl. No.: 09/778,151

(22) Filed: Jan. 31, 2001

Related U.S. Application Data

(60) Provisional application No. 60/179,308, filed on Jan. 31, 2000.

(51) Int. Cl.[7] .................................................. G06K 9/00
(52) U.S. Cl. ....................................... 382/169; 382/298
(58) Field of Search .............................. 382/168, 169, 382/254, 274, 298, 299, 170, 172, 131, 132, 273; 348/671, 672

(56) References Cited

U.S. PATENT DOCUMENTS

| | | | | |
|---|---|---|---|---|
| 4,445,138 A | * | 4/1984 | Zwirn et al. ................ | 348/672 |
| 5,063,607 A | * | 11/1991 | FitzHenry et al. .......... | 382/274 |
| 5,249,241 A | * | 9/1993 | Silverman et al. .......... | 382/169 |
| 5,640,469 A | * | 6/1997 | Lewins et al. .............. | 382/274 |
| 6,148,103 A | * | 11/2000 | Nenonen .................... | 382/169 |
| 6,215,900 B1 | * | 4/2001 | Schwenker et al. ......... | 382/168 |
| 6,507,668 B1 | * | 1/2003 | Park .......................... | 382/169 |
| 6,606,418 B2 | * | 8/2003 | Mitchell et al. ............ | 382/251 |

OTHER PUBLICATIONS

Yu et al. Histogram–shape preserving algorithm for image enchancement, IEEE Int'l Symposium on Circuits and Systems, May 03–06, 1993, vol. 1, p 407–410.*

* cited by examiner

*Primary Examiner*—Yon J. Couso
(74) *Attorney, Agent, or Firm*—Dickstein Shapiro Morin & Oshinsky LLP

(57) ABSTRACT

Dynamic range equalization by histogram modification. A histogram is analyzed to determine locations of peaks. A mapping function is formed which relates to the locations of the peaks in a histogram. That mapping function may have areas of highest slope near the peaks. The mapping function is used to form a compressed histogram, which has the required number of levels to display on a display device.

19 Claims, 3 Drawing Sheets

DYNAMIC HISTOGRAM EQUALIZATION FOR HIGH DYNAMIC RANGE IMAGES

CROSS-REFERENCE TO RELATED APPLICATIONS

The present application claims benefit of U.S. Provisional Application No. 60/179,308, filed Jan. 31, 2000.

BACKGROUND

Images can be represented as electronic versions of the scene being viewed. The electronic image may represent a scene to that has a very high dynamic range, e.g. 18 bits or more of dynamic range. However, conventional display devices typically only display 8-bit-images. Therefore, it is often necessary to display a higher dynamic range scene on a lower dynamic range viewing device.

If the same quantization step is used in an attempt to make this display operation, then either the brightest part of the image or the darkest part of the image is often lost.

SUMMARY

The present application teaches nonlinearly mapping an image with higher number of bits to an image with a smaller number of bits, while preserving at least part of the local contrast.

According to the present system, this is done by using a local transformation that can rapidly change characteristics of the image.

BRIEF DESCRIPTION OF THE DRAWINGS

These and other aspects will now be described in detail with reference to the accompanying drawings, wherein.

DETAILED DESCRIPTION

Figure 1:
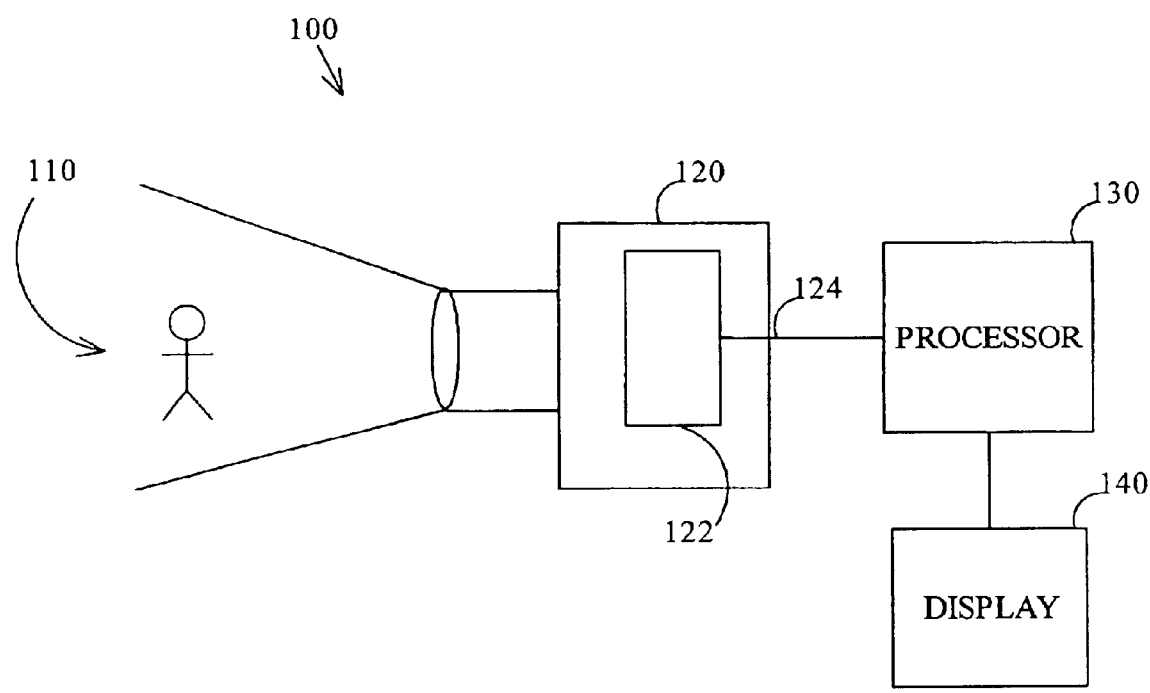
FIG. 1 shows a block diagram of an imaging system using the present system.

An embodiment is shown in FIG. 1. In the FIG. 1 embodiment, an imaging system, generally shown as 100, obtains an image of the scene 110. The image may be obtained by an image acquisition device 120, which may include an active pixel sensor 122 receiving light indicative of the image of the scene 110, and converting that light into a signal 124 indicative of pixel-level received signals. A processor 130 may process this image in a specified way as described herein, to reduce the number of bits of signal dynamic range. The output of the processor may be displayed on the display 140. For this purpose, the processor 130 may also include a display driver.

Figure 5:
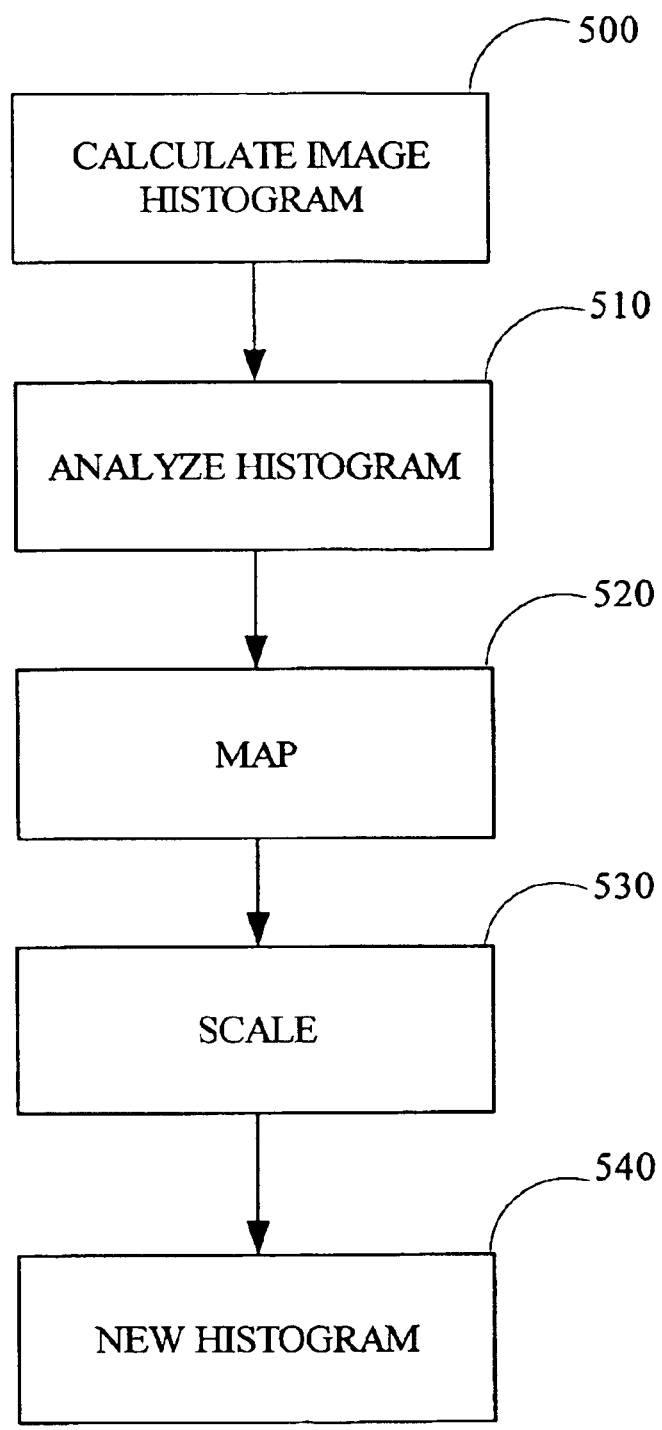
FIG. 5 shows a flowchart of operation of the processor.

In this embodiment, the image 124, which is produced by the image sensor 122, may have a higher dynamic range that is capable of being displayed on display 140. Accordingly, the operation of the present system modifies the histogram of the mage. The processor does this by carrying out the flowchart of FIG. 5.

At 500, an initial operation calculates an image histogram. The histogram is shown as 200 in FIG. 2.

The histogram is analyzed at 510. On typical analysis, 90 percent of the pixel values will often gather around several gray levels. Other gray levels typically have very few pixels falling on them.

Figure 2:
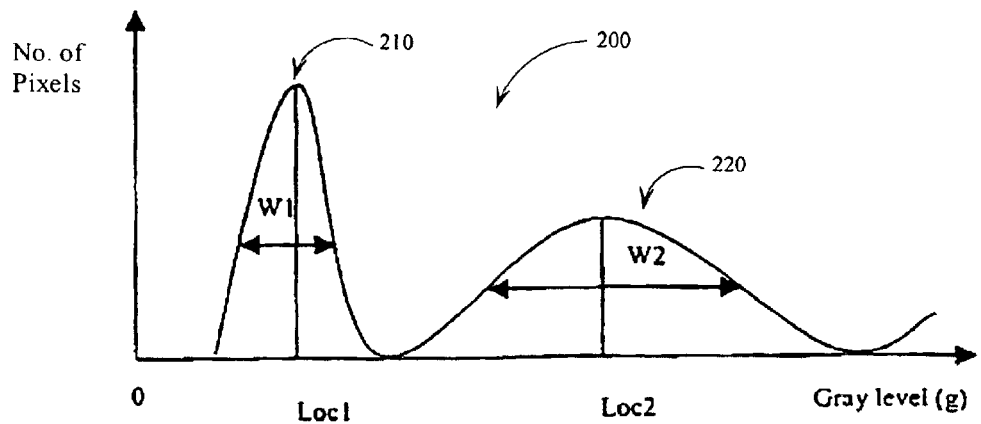
FIG. 2 shows an example histogram.

FIG. 2 shows the situation where most of the pixels fall within two areas. This can be applied to an image by selecting the two largest peaks, or by using multiple peaks.

In FIG. 2, the peaks are shown as 210 having a width WI and 220 having a width w2. The centerline of the first area is labeled as loc1, and the centerline of the second area is labeled as loc2.

The present system compresses the image in a way such that the areas which have more common values are allocated to receive more gray levels. Fewer numbers of gray levels are allocated to other values which have fewer pixels falling on them. An attempt is also made to preserve the relative brightness.

At 520, the histogram is mapped, using the centerline locations loc1, loc2, and the widths of the peaks w1 and w2. A monotonous increasing mapping curve path m(g) is formed. This curve path is monotonic, in the sense that it is continually increasing. However, it is non-linear, in the sense that its slope is changing.

Figure 3:
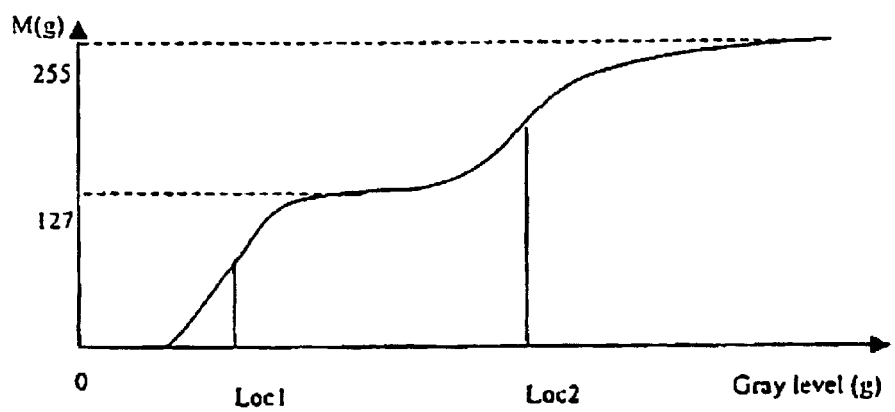
FIG. 3 shows a mapping curve for the histogram of FIG. 2.

The slope of the histogram mapping curve is highest in the areas of the peaks of the actual image histogram. FIG. 3 shows the mapping curve used for the example histograms in FIG. 2. The slopes are increased in the areas of Loc1 and Loc2.

The mapping curve uses the sigmoid functions for each of the peaks:

$$f(g) = \frac{-1 + \exp\frac{g - loc1}{w1}}{1 + \exp\frac{g - loc1}{w1}} + \frac{-1 + \exp\frac{g - loc2}{w2}}{1 + \exp\frac{g - loc2}{w2}}$$

where g is the gray level. If more than two peaks are present, then more terms can be added. In general, all points are scaled based on their relationship with the position of the maximum $(g - loc_x)$, weighted by the width of the peak $(w_x)$.

The mapping curve is then scaled at 530 to scale the mapping curve between zero and $2^8 - 1 = 255$ according to:

$$m(g) = 255 \times \frac{f(g) - f(\min(g))}{f(\max(g)) - f(\min(g))}$$

Where g is the original gray value, and m(g) is the compressed gray value. This mapping technique maintains the image after mapping to keep both the local and global constraints of the original image.

Figure 4:
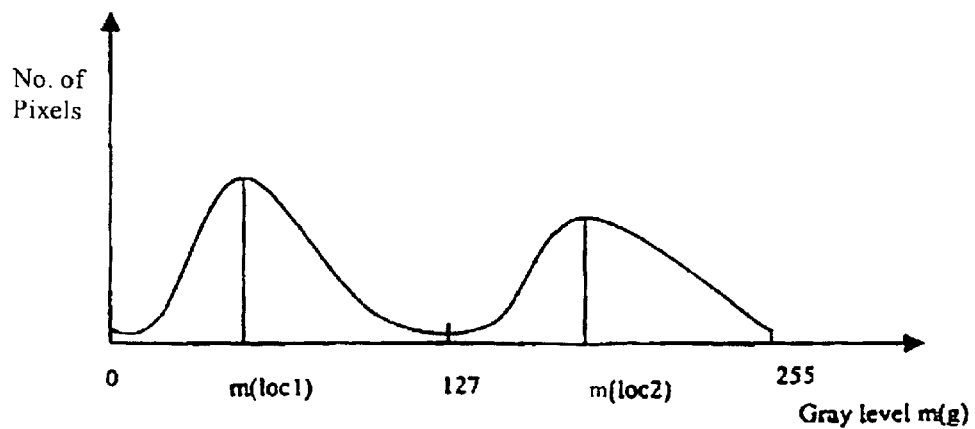
FIG. 4 shows a histogram of the final compressed image.

The scaled image forms a new histogram at 540. The new histogram is shown in FIG. 4. In this histogram, the basic shape of the histogram space is the same. That is, the heights of the peaks in the new histogram may be in new compressed locations, but the heights of the peaks keep the same relationship as in the original histogram. However, the number of levels are compressed to the required number of bits, to allow the image to be displayed on a lower dynamic range display.

The above has described how to map the image to an 8-bit image. However, more generally, the image can be mapped to $2^n$ gray levels, by using the more general scaling equation shown below.

$$m(g) = (2^n - 1) \times \frac{f(g) - f(\min(g))}{f(\max(g)) - f(\min(g))}$$

Although only a few embodiments have been disclosed on detail above, other modifications are possible. For example, this system can of course be used with other kinds of images besides the image from an active pixel sensor. In addition, different numbers of bits can be used. While this shows using only the most prominent two histogram peaks, more than two histogram peaks may be used. While this describes being used if for gray levels, it more generally can be used with any kind of dynamic range levels, such as number of colors and the like.

All such modifications are intended to be encompassed within the following claims, in which:

What is claimed is:

1. A method, comprising:

obtaining a signal indicative of an image;

forming an original histogram indicative of the signal, said histogram including information indicative of numbers of dynamic range levels in the signal;

forming a mapping function, which relates each dynamic range level to positions of peaks in the original histogram;

scaling said original histogram based on said mapping function, wherein said mapping function forms a curve which has areas of highest slope near said peaks in said original histogram, wherein said forming a mapping function comprises determining center portions of said peaks, and characterizing dynamic range levels based on their relationship with said center portions of said peaks; and determining widths of peak areas in said original histogram, and weighting the dynamic range levels based on said widths of said peak areas.

2. A method as in claim 1, wherein there are two of said peaks.

3. A method as in claim 1, further comprising forming a new histogram based on said scaling, and displaying an image based on said new histogram.

4. A method as in claim 1, wherein said obtaining an image comprises using an active pixel sensor to obtain an image.

5. A method as in claim 3, wherein said mapping function is monotonous.

6. A method, comprising:

obtaining a signal indicative of an image;

forming an original histogram indicative of the signal, said histogram including information indicative of numbers of dynamic range levels in the signal;

forming a mapping function, which relates each dynamic range level to positions of peaks in the original histogram; and scaling said original histogram based on said mapping function, wherein said dynamic range levels are gray scale levels, and said forming a mapping function comprises forming a mapping curve which is based on the equation $$f(g) = \frac{-1 + \exp\frac{g - loc1}{w1}}{1 + \exp\frac{g - loc1}{w1}} + \frac{-1 + \exp\frac{g - loc2}{w2}}{1 + \exp\frac{g - loc2}{w2}},$$

where loc1 and w1 are respectively center points and widths of a first peak, g is a gray level, and loc2 and w2 are respectively center points and widths of a second peak.

7. A method as in claim 6, wherein said scaling comprises scaling the mapping curve according to $$m(g) = (2^n - 1) \times \frac{f(g) - f(\min(g))}{f(\max(g)) - f(\min(g))},$$

where f(g) is the mapping curve, and n is the number of gray levels to which the mapping curve is to be scaled.

8. A method, comprising:

obtaining a signal indicative of an image;

forming an original histogram indicative of the signal, said histogram including information indicative of numbers of dynamic range levels in the signal;

forming a mapping function, which relates each dynamic range level to positions of peaks in the original histogram; and scaling said original histogram based on said mapping function, wherein said dynamic range levels are gray scale levels, and said forming a mapping function comprises forming a mapping curve, and wherein said scaling comprises scaling the mapping curve according to $$m(g) = (2^n - 1) \times \frac{f(g) - f(\min(g))}{f(\max(g)) - f(\min(g))},$$

where f(g) is the mapping curve, g is an original gray level, and n is the number of dynamic range levels to which the mapping curve is to be scaled.

9. A method as in claim 3, wherein said mapping function has a form that preserves relative brightness of a transformed image.

10. A method as in claim 9, wherein the new histogram has peaks in proportional locations to those in the original histogram, and a relationship between heights of said peaks of the new histogram is the same as a relationship between heights of peaks in the original histogram.

11. An apparatus, comprising:

an image acquisition element, obtaining an original signal indicative of an image of a scene; and a processor, modifying said original signal to produce a modified signal, wherein the modified signal has fewer levels of dynamic range than the original signal, said processor operating by calculating an original image histogram, calculating a mapping function for the original image histogram which comprises a monotonous function having changes in said function which occur predominately at areas of peaks in said original image histogram, and forming a new compressed histogram based on said mapping function, wherein said mapping function depends on center portions of said peaks and widths of said peaks.

12. An apparatus as in claim 11, wherein said image acquisition device includes an active pixel sensor.

13. An apparatus as in claim 11, wherein said processor forms a mapping curve which has areas of highest change near said areas of peaks in the original image histogram.

14. An apparatus as in claim 13, wherein there are two of said peaks.

15. An apparatus as in claim 13, wherein there are n of said peaks and where n is an integer.

16. An apparatus as in claim 11, wherein said processor carries out said mapping function by comparing a gray level of the original signal with a level at a peak.

17. An apparatus as in claim 16, wherein said processor forms said mapping function by weighting said function using said widths.

18. An apparatus as in claim 11, further comprising a display device, having the capability of displaying n levels, where n is less than a number of levels in the original signal and where n is an integer.

19. A method, comprising:

obtaining a higher dynamic range signal;

forming a first histogram between components of the signal indicative of dynamic range levels in the signal, and numbers of those dynamic range levels;

finding peaks in said first histogram; and transforming said first histogram into a modified histogram which keeps a similar specified relationship between said peaks and which represents a lower dynamic range signal, wherein said transforming comprises forming a mapping function based on the original histogram, and using said mapping function to form a modified histogram, wherein said mapping function relates each dynamic range level to positions of said peaks in said first histogram, forms a curve that has areas of highest slope near said peaks, determines center portions of said peaks, characterizes dynamic range levels based on their relationship with said center portions of said peaks, determines widths of peak areas in said first histogram, and weighs the dynamic range levels based on said widths.

* * * * *